US012754387B2

(12) United States Patent
Yamada et al.

(10) Patent No.: US 12,754,387 B2
(45) Date of Patent: Oct. 6, 2026

(54) FIBER OPTIC CABLE

(71) Applicant: NTT, Inc., Tokyo (JP)

(72) Inventors: Yusuke Yamada, Musashino (JP); Kazuhide Nakajima, Musashino (JP)

(73) Assignee: NTT, Inc., Tokyo (JP)

( * ) Notice: Subject to any disclaimer, the term of this patent is extended or adjusted under 35 U.S.C. 154(b) by 238 days.

(21) Appl. No.: 18/682,993

(22) PCT Filed: Aug. 19, 2021

(86) PCT No.: PCT/JP2021/030375

§ 371 (c)(1),
(2) Date: Feb. 12, 2024

(87) PCT Pub. No.: WO2023/021657

PCT Pub. Date: Feb. 23, 2023

(65) Prior Publication Data

US 2024/0361551 A1 Oct. 31, 2024

(51) Int. Cl.
*G02B 6/44* (2006.01)

(52) U.S. Cl.
CPC .................................. *G02B 6/4413* (2013.01)

(58) Field of Classification Search
CPC ........................................................ G02B 6/44
USPC .......................................................... 385/100
See application file for complete search history.

(56) References Cited

U.S. PATENT DOCUMENTS

| | | | | |
|---|---|---|---|---|
| 2002/0122640 A1* | 9/2002 | Strong | G02B 6/4411 385/114 |
| 2003/0091307 A1 | 5/2003 | Hurley et al. | |
| 2011/0110635 A1* | 5/2011 | Toge | G02B 6/441 385/102 |

(Continued)

FOREIGN PATENT DOCUMENTS

| | | |
|---|---|---|
| JP | H0485407 U | 7/1992 |
| JP | 2007-041568 A | 2/2007 |
| WO | 2016048804 A1 | 3/2016 |

OTHER PUBLICATIONS

Taiji Sakamoto, et al., "Crosstalk suppressed hole-assisted 6-core fiber with cladding diameter of 125 μm", 39th European Conference and Exhibition on Optical Communication (ECOC 2013).

(Continued)

*Primary Examiner* — Kaveh C Kianni
(74) *Attorney, Agent, or Firm* — Harness, Dickey & Pierce, P.L.C.

(57) ABSTRACT

An object of the present invention is to ensure low crosstalk for all multi-core optical fibers in an optical fiber cable having a plurality of identical multi-core optical fibers of non-coupling type in different spiral shapes.

An optical fiber cable according to the present disclosure is an optical fiber cable formed by twisting a plurality of units each of which is formed by bundling a plurality of identical multi-core optical fibers of non-coupling type, which includes: that all the units have the same diameter; that the units are arranged in a plurality of layers from a center in a cross section; that the units are arranged in a spiral shape for each of the layers in a longitudinal direction; that all the units included in one of the layers have the same twist pitch of the spiral shape; and that the twist pitch is different for each layer, and is set based on a curvature Rpk of the multi-core optical fiber where crosstalk is the largest.

4 Claims, 4 Drawing Sheets

(56) References Cited

U.S. PATENT DOCUMENTS

2013/0084047 A1* 4/2013 Baucom ............. G02B 6/44384
29/514
2013/0251320 A1* 9/2013 Hayashi ............... G02B 6/4401
385/100
2013/0301998 A1* 11/2013 Hayashi ............... G02B 6/4413
385/100
2015/0234139 A1* 8/2015 Cignarale ............ G02B 6/4403
385/114
2016/0041354 A1* 2/2016 Guenter ............... G02B 6/4431
385/86
2016/0299306 A1* 10/2016 McAlpine ............ G02B 6/4431
2017/0235068 A1* 8/2017 Debban ................ G02B 6/4494
385/110
2017/0299806 A1* 10/2017 Kopp ................. G02B 6/02042
2017/0370704 A1* 12/2017 Froggatt ................. G01L 1/242
2018/0252885 A1 9/2018 Guenter et al.
2019/0094459 A1* 3/2019 Froggatt ............ G02B 6/02042
2022/0214496 A1* 7/2022 Sakamoto .......... G02B 27/0012
2024/0134127 A1* 4/2024 Fukai ..................... G02B 26/08

OTHER PUBLICATIONS

Masanori Koshiba, et al., "Analytical Expression of Average Power-Coupling Coefficients for Estimating Intercore Crosstalk in Multicore Fibers", IEEE Photonics Journal Year: 2012, vol. 4, Issue: 5.
Yusuke Yamada, et al., "Design of High-Density Cable Parameters for Controlling Spatial-Mode Dispersion of Randomly Coupled Multi-Core Fibers" Journal of Lightwave Technology Year: 2021, vol. 39, Issue: 4.

* cited by examiner

FIBER OPTIC CABLE

TECHNICAL FIELD

The present invention relates to an optical fiber cable with a small diameter and high density by bundling coated optical fiber core wires.

BACKGROUND ART

An optical fiber cable with a small diameter and high density by bundling coated optical fibers has been proposed (for example, PTL 1). The optical fiber cable has a structure in which a plurality of units each of which is formed by bundling single-core coated optical fibers and these units are twisted together. With such a structure, a multi-core optical fiber cable can be realized with a small diameter and a light weight, and handling property is improved, and it can be laid in various places.

Further, in recent years, it is required to increase the spatial multiplicity of the optical fiber itself with an increase in the transmission capacity. As one technique for increasing spatial multiplicity, a multi-core optical fiber having a plurality of cores capable of propagating a plurality of light into one optical fiber has been proposed (see, for example, NPL 1).

With the optical fiber cable having a structure in which a plurality of units each of which is formed by bundling multi-core coated optical fibers and these units are twisted together, the optical fiber cable having a small diameter and high density can be realized while coping with an increase in transmission capacity. Further, the transmission capacity of the optical fiber cable can be more increased with the structure of the optical fiber cable composed of a plurality of layers such that additional units are collectively twisted around inner twisted units.

CITATION LIST

Patent Literature

[PTL 1] Japanese Patent Application Publication No. 2007-41568

Non Patent Literature

[NPL 1] "Crosstalk suppressed hole-assisted 6-core fiber with cladding diameter of 125 μm" 39th European Conference and Exhibition on Optical Communication (ECOC 2013)

[NPL 2] "Analytical Expression of Average Power-Coupling Coefficients for Estimating Intercore Crosstalk in Multicore Fibers" IEEE Photonics Journal Year: 2012|Volume: 4, Issue:

[NPL 3] "Design of High-Density Cable Parameters for Controlling Spatial-Mode Dispersion of Randomly Coupled Multi-Core Fibers" Journal of Lightwave Technology Year: 2021|Volume: 39, Issue: 4

SUMMARY OF INVENTION

Technical Problem

On the other hand, in a multi-core optical fiber, it is important to suppress crosstalk between lights propagating through the respective cores. It is known that this crosstalk is affected by bending of a multi-core optical fiber, that is, curvature (see, for example, NPL 2). Therefore, the multi-core optical fiber can suppress crosstalk with its curvature.

In the above-mentioned optical fiber cable having a plurality of layers, the curvature is different for each of the layers in the optical fiber cable. In this regard, even though application of a multi-core optical fiber to the optical fiber cable can control crosstalk with a curvature of one of the plurality of layers in the optical fiber cable, control of crosstalk cannot be guaranteed in the other layers having different curvatures. Therefore, there is a problem that it is difficult to suppress crosstalk with respect to all multi-core optical fibers in an optical fiber cable composed of a plurality of layers.

Therefore, in order to solve the above problem, the present invention is intended to control crosstalk with respect to all multi-core optical fibers in an optical fiber cable that are a plurality of identical multi-core optical fibers of non-coupling type having different spiral shapes.

Solution to Problem

In order to achieve the above object, in the optical fiber cable of the present disclosure having a plurality of layers formed by collectively twisting units each of which is formed by bundling multi-core optical fibers, twist pitches of the units, in each layer of the optical fiber cable, are defined to be appropriately set for control of crosstalk between cores of the multi-core optical fibers.

Specifically, an optical fiber cable according to the present disclosure is an optical fiber cable formed by twisting a plurality of units each of which is formed by bundling a plurality of identical multi-core optical fibers of non-coupling type, which includes: that all the units have the same diameter; that the units are arranged in a plurality of layers from a center in a cross section; that the units are arranged in a spiral shape for each of the layers in a longitudinal direction; that all the units included in one of the layers have the same twist pitch of the spiral shape; and that the twist pitch is different for each layer, and is set based on a curvature Rpk of the multi-core optical fiber where crosstalk becomes the largest.

For example, the optical fiber cable according to the present disclosure includes: a twist radius r1 of the spiral shape of the unit arranged in an innermost layer being set by a Math. C1; a curvature ρ1 of the spiral shape of the unit arranged in the innermost layer being set by a Math. C2; a curvature ρm of the spiral shape of the unit arranged in a specific layer different from the innermost layer being set by a Math. C3; and a twist pitch Pm of the spiral shape of the units arranged in the specific layer being set by a Math. C4, in which the curvature Rpk does not coincide with the curvature ρ1.

[Math. C1]

$$r1 = d / \{2 \times \sin(\pi / n)\} \quad \text{(C1)}$$

[Math. C2]

$$\rho 1 = r1 \Big/ \left(r1^2 + P1/2\pi)^2\right) \quad \text{(C2)}$$

[Math. C3]

$$\rho_m = \{r1 + d(m-1)\} \Big/ \left[\{r1 + d(m-1)\}^2 + (Pm/2\pi)^2\right] \quad \text{(C3)}$$

-continued

[Math. C4]

$$Pm = 2\pi\sqrt{\frac{r1 + d(m-1)\cdot r1^2 + \left(\frac{P1}{2\pi}\right)^2 - [r1 + d(m-1)]^2}{r1}} \quad (C4)$$

Where d represents the diameter, n represents the number of units in the innermost layer, P1 represents a twist pitch of the spiral shape of the units arranged in the innermost layer, and m represents the number of layers from the center of the specific layer when the innermost layer assumes a first layer.

For example, the optical fiber cable according to the present disclosure includes: a twist radius r1 of the spiral shape of the unit arranged in an innermost layer being set by a Math. C5; a curvature ρ1 of the spiral shape of the unit arranged in the innermost layer being set by a Math. C6; a curvature ρm of the spiral shape of the unit arranged in a specific layer different from the innermost layer being set by a Math. C7; and a twist pitch Pm of the unit arranged in the specific layer being set by a Math. C8, where the curvature Rpk is smaller than the curvature ρ1.

[Math. C5]

$$r1 = d/\{2\times\sin(\pi/n)\} \quad (C5)$$

[Math. C6]

$$\rho 1 = r1\big/\left(r1^2 + (P1/2\pi)^2\right) \quad (C6)$$

[Math. C7]

$$\rho_m = \{r1 + d(m-1)\}\big/\left[\{r1 + d(m-1)\}^2 + (Pm/2\pi)^2\right] \quad (C7)$$

[Math. C8]

$$Pm \geqq 2\pi\sqrt{\frac{r1 + d(m-1)\cdot r1^2 + \left(\frac{P1}{2\pi}\right)^2 - [r1 + d(m-1)]^2}{r1}} \quad (C8)$$

Where d represents the diameter, n represents the number of units in the innermost layer, P1 represents a twist pitch of the spiral shape of the units arranged in the innermost layer, and m represents the number of layers from the center of the specific layer when the innermost layer assumes a first layer.

For example, the optical fiber cable according to the present disclosure includes: a twist radius r1 of the spiral shape of the unit arranged in an innermost layer being set by a Math. C9; a curvature ρ1 of the spiral shape of the unit arranged in the innermost layer being set by a Math. C10; a curvature ρm of the spiral shape of the unit arranged in a specific layer different from the innermost layer being set by a Math. C11; and a twist pitch Pm of the unit arranged in the specific layer being set by a Math. C12, where the curvature Rpk is larger than the curvature ρ1.

[Math. C9]

$$r1 = d/\{2\times\sin(\pi/n)\} \quad (C9)$$

[Math. C10]

$$\rho 1 = r1\big/\left(r1^2 + (P1/2\pi)^2\right) \quad (C10)$$

[Math. C11]

$$\rho_m = \{r1 + d(m-1)\}\big/\left[\{r1 + d(m-1)\}^2 + (Pm/2\pi)^2\right] \quad (C11)$$

-continued

[Math. C12]

$$Pm \leqq 2\pi\sqrt{\frac{r1 + d(m-1)\cdot r1^2 + \left(\frac{P1}{2\pi}\right)^2 - [r1 + d(m-1)]^2}{r1}} \quad (C12)$$

Where d represents the diameter, n represents the number of units in the innermost layer, P1 represents a twist pitch of the spiral shape of the units arranged in the innermost layer, and m represents the number of layers from the center of the specific layer when the innermost layer assumes a first layer. In the optical fiber cable of the present disclosure, by adjusting a twist pitch of a unit for each layer, a curvature of a multi-core optical fiber for composition of a unit should be shifted from a curvature Rpk at which crosstalk of the multi-core optical fiber becomes maximum. Thus, crosstalk of all the multi-core optical fibers in an optical fiber cable can be suppressed.

Further, in the optical fiber according to the present disclosure, twisting directions of the spiral shapes of the units arranged in layers adjacent to each other may be different from each other.

Thus, the unit can be stably manufactured at a desired twist pitch by suppressing the replacement of the positions of the adjacent units between the adjacent layers.

The above each of the inventions can be combined as much as possible.

Advantageous Effects of Invention

According to the present disclosure, low crosstalk can be ensured for all multi-core optical fibers in an optical fiber cable having a plurality of identical multi-core optical fibers of non-coupling type in different spiral shapes.

DESCRIPTION OF EMBODIMENTS

Embodiments of the present disclosure will be described hereinafter in detail with reference to the drawings. The present invention is not limited to the embodiments to be described below. These embodiments are merely exemplary and the present disclosure can be implemented in various modified and improved modes based on the knowledge of those skilled in the art. Constituent elements with the same reference signs in the present specifications and the drawings are identical to each other.

Embodiment

Figure 1:
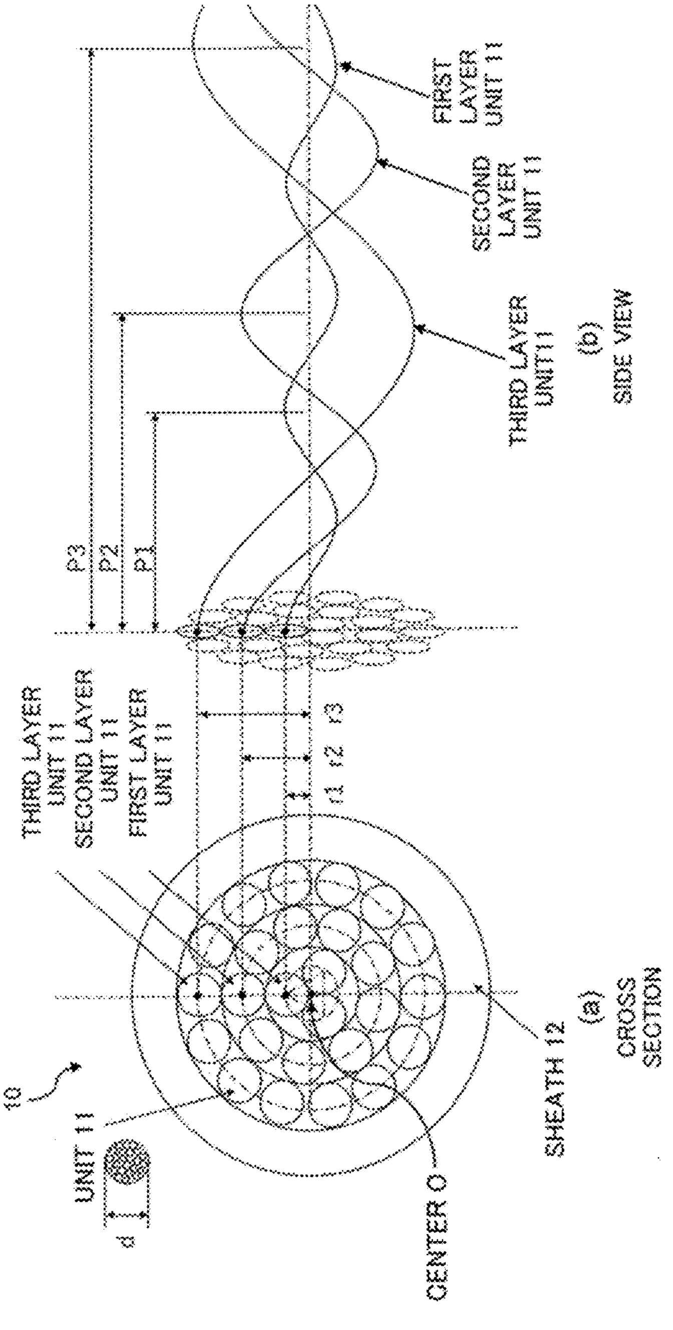
FIG. 1 shows an example of a schematic structure of an optical fiber cable according to an embodiment.

An example of the optical fiber cable 10 according to the present embodiment is shown in FIG. 1.

The optical fiber cable 10 according to the present embodiment is the optical fiber cable 10 formed by twisting a plurality of units 11 each of which is formed by bundling a plurality of identical multi-core optical fibers of non-coupling type, which includes: that all the units 11 have the same diameter; that the units 11 are arranged in a plurality of layers from a center O in a cross section; that the units 11 are arranged in a spiral shape for each of the layers in a longitudinal direction; that all the units 11 included in one of the layers have the same twist pitch of the spiral shape; and that the twist pitch is different for each layer, and is set based on the curvature Rpk of the multi-core optical fiber where the crosstalk becomes the largest.

FIG. 1(*a*) shows a cross-sectional view perpendicular to a longitudinal direction of the optical fiber cable 10. In the optical fiber cable 10 according to the present embodiment, as shown in the cross-sectional view of FIG. 1(*a*), a first layer is formed by units 11 having their own centers on a circumference with a distance r1 from the center O as a radius in the cross-section of the optical fiber cable 10. A second layer is formed by units 11 having their own centers on a circumference with a distance r2 as a radius from the center O in the cross-section of the optical fiber cable 10. A third layer is formed by units 11 having their own centers on a circumference with a distance r3 as a radius from the center O in the cross section of the optical fiber cable 10. Although the present embodiment has a three-layer structure, the number of layers is arbitrary. Further, the optical fiber cable 10 according to the present embodiment has a structure in which the outer periphery of the twisted units 11 is covered with a sheath 12.

In the optical fiber cable 10 according to the present embodiment, the unit 11 forming the first layer with a distance r1 as a twist radius, has a spiral shape along the longitudinal direction of the optical fiber cable 10. Similarly, the unit 11 forming the second layer with a distance r2 as a twist radius, and the unit 11 forming the third layer with a distance r3 as a twist radius, each of which has a spiral shape along the longitudinal direction of the optical fiber cable 10.

States of these spiral shapes from the side are shown in the side view of FIG. 1(*b*). The side view of FIG. 1(*b*) shows a shape viewed from the side by extracting the units 11 included in each layer one by one. As shown in the side view of FIG. 1(*b*), the unit in each layer has a wave shape like a sine wave when viewed from the side. The amplitude of the wave shape corresponds to the twist radius. Further, the wavelength of the wave shape is called a twist pitch, and P1 should be set for the first layer, P2 should be set for the second layer, and P3 should be set for the third layer.

By the way, the multi-core optical fiber included in each unit 11 is similarly bent in a spiral shape according to the unit 11, and the curvature of the multi-core optical fiber should be the same as that of the unit 11 including itself.

Here, with focusing attention on a unit 11 included in the first layer (hereinafter referred to as "first layer unit 11"), a curvature ρ1 of the spiral shape of the first layer unit 11 is expressed by a following equation.

[Math. 1]

$$\rho 1 = r1 / \left( r1^2 + (P1/2\pi)^2 \right) \tag{1}$$

According to this equation, the curvature ρ1 is determined by the pitch P1 and the twist radius r1. Where the pitch P1 and the twist radius r1 should be set so that the curvature ρ1 does not coincide with a curvature Rpk described later. A twist radius r1 is expressed by a following equation according to the number n of the first layer units 11 and the diameter d of the unit 11.

[Math. 2]

$$r1 = d / \{2 \times \sin(\pi/n)\} \tag{2}$$

Next, attention will be focused on the unit 11 included in the second layer (hereinafter referred to as "second layer unit 11"). Since the second layer is twisted around the outer periphery of the first layer, a curvature ρ2 of the spiral shape of the second layer unit 11 is expressed by a following equation.

[Math. 3]

$$\rho 2 = r2 / \left( r2^2 + (P2/2\pi)^2 \right) \tag{3}$$

The unit 11 included in the third layer (hereinafter referred to as "third layer unit 11") is similarly expressed by a following equation.

[Math. 4]

$$\rho 3 = r3 / \left( r3^2 + (P3/2\pi)^2 \right) \tag{4}$$

That is, a curvature ρm of the spiral shape of the unit 11 included in the m-th layer (hereinafter referred to as "m-th layer unit 11") is expressed by a following equation. Where m is an integer of 2 or more.

[Math. 5]

$$\rho_m = \{r1 + d(m-1)\} / \left[ \{r1 + d(m-1)\}^2 + (Pm/2\pi)^2 \right] \tag{5}$$

Here, in order to set the curvature of the spiral shape of the optical fiber in the first layer unit 11 equal to that of the optical fiber in the m-th layer unit 11, the units 11 should be twisted so as to satisfy the following equation obtained by connecting the right side of the equation (1) and the right side of the equation (5) by an equal sign.

[Math 6]

$$r1 / \left( r1^2 + (P1/2\pi)^2 \right) = \{r1 + d(m-1)\} / \left[ \{r1 + d(m-1)\}^2 + (Pm/2\pi)^2 \right] \tag{6}$$

Each unit diameter and spiral radius are determined by the number of coated optical fibers in the unit and the number of units. Therefore, with adjusting Pm, the curvature of the m-th layer unit 11, that is, the multi-core optical fiber can be made equal to that of the first layer unit 11. This Pm is expressed by a following equation according to the above equation.

[Math. 7]

$$Pm = 2\pi \sqrt{\frac{r1 + d(m-1) \cdot r1^2 + \left( \frac{P1}{2\pi} \right)^2 - [r1 + d(m-1)]^2}{r1}} \tag{7}$$

Figure 2:
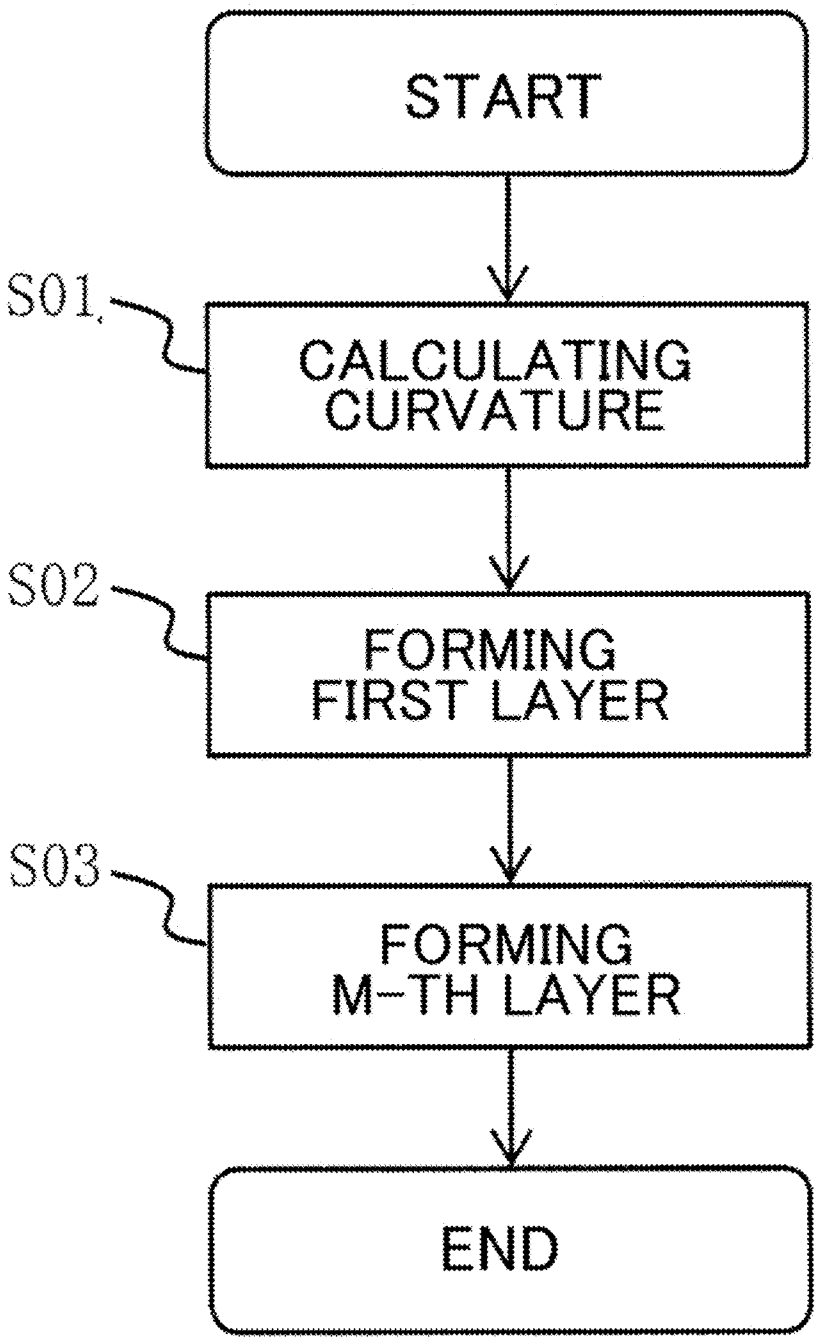
FIG. 2 shows an example of a procedure in a method of design of an optical fiber cable according to an embodiment.

With such a structure, the curvature of the optical fiber in the optical fiber cable 10 can be made uniform. Here, an example of a method for manufacturing the optical fiber cable 10 according to the present embodiment is shown in FIG. 2. Depending on a design of a multi-core optical fiber, that is, crosstalk characteristics of the multi-core optical fiber (see, e.g., NPL 2), a curvature capable of controlling crosstalk is calculated (step S01), the number of units and the twist pitch of the first layer unit 11 is set so as to satisfy the relevant curvature (step S02), and twist pitches of the units 11 arranged in each layer are set by using the equation (7) so as to uniformize the curvatures of the units of each layer in the optical fiber cable (step S03). Here, in the step S01, calculating a curvature avoiding the curvature Rpk to be described later. By way of these procedures, the optical fiber cable 10 according to the present embodiment can be manufactured, and crosstalk of all the multi-core coated optical fibers in the optical fiber cable 10 can be controlled.

Next, a range in which the twist pitch can be set in consideration of the crosstalk characteristics of the multi-core optical fiber will be described. It is known that the crosstalk of the multi-core optical fiber takes a maximum value at a certain curvature Rpk as in the NPL 2, and it is sufficient to form a cable so as to avoid the Rpk.

For example, when the curvature of Rpk is $\rho=20\ m^{-1}$ ($1/\rho[m^{-1}]=50$ [mm] expressed by a bending radius), the unit diameter is d=1.5 mm (measured example of unit diameter obtained by bundling 20 fibers with 0.25 mm diameter), and the number of units n is 3, then the twist radius r1=0.86 mm is obtained in accordance with the equation (2) and a pitch P1=41 mm is obtained by substituting the twist radius r1 into the equation (1). Thus, it is sufficient to manufacture while avoiding this pitch. Here, when P1 is set so that ρ1 is sufficiently, e.g. about one digit, smaller than Rpk, a change amount in crosstalk with respect to a curvature change of an optical fiber becomes small (see, for example, NPL 2). Therefore, it is not necessary that the curvatures of the first layer unit 11 and the m-th layer unit 11 are completely the same, and it is sufficient not to be deteriorated in crosstalk. In this case, the pitch Pm of the m-th layer unit 11 can be set so as to satisfy a following equation (8).

[Math. 8]

$$Pm \geqq 2\pi\sqrt{\frac{r1+d(m-1)\cdot r1^2+\left(\frac{P1}{2\pi}\right)^2-[r1+d(m-1)]^2}{r1}} \tag{8}$$

Thus, it is not necessary to strictly set the twist pitch, and the productivity of the optical cable can be improved.

Also, even when P1 is set so that ρ1 is sufficiently larger than Rpk, for example, by one digit, a change amount in crosstalk with respect to a curvature change of an optical fiber becomes small (see, for example, NPL 2). Therefore, it is not necessary that the curvatures of the first layer unit 11 and the m-th layer unit 11 are completely the same, and it is sufficient not to be deteriorated in crosstalk. In this case, the pitch Pm of the m-th layer unit 11 can be set so as to satisfy a following equation (9).

[Math. 9]

$$Pm \leqq 2\pi\sqrt{\frac{r1+d(m-1)\cdot r1^2+\left(\frac{P1}{2\pi}\right)^2-[r1+d(m-1)]^2}{r1}} \tag{9}$$

Thus, it is not necessary to strictly set the twist pitch, and the productivity of the optical cable can be improved.

By the way, the above-described method for manufacturing the optical fiber cable 10 can be also applied to the case where the equations (8) and (9) are used. Specifically, in the steps S01 and S02 are performed as described above. Thereafter, when the curvature (ρ1) calculated in the step S01 becomes sufficiently smaller than Rpk or when the curvature (ρ1) calculated in the step S01 is sufficiently larger than Rpk, then in the step S03, the twist pitch of the unit 11 of each layer is set based on the equation (8) or the equation (9).

Figure 3:
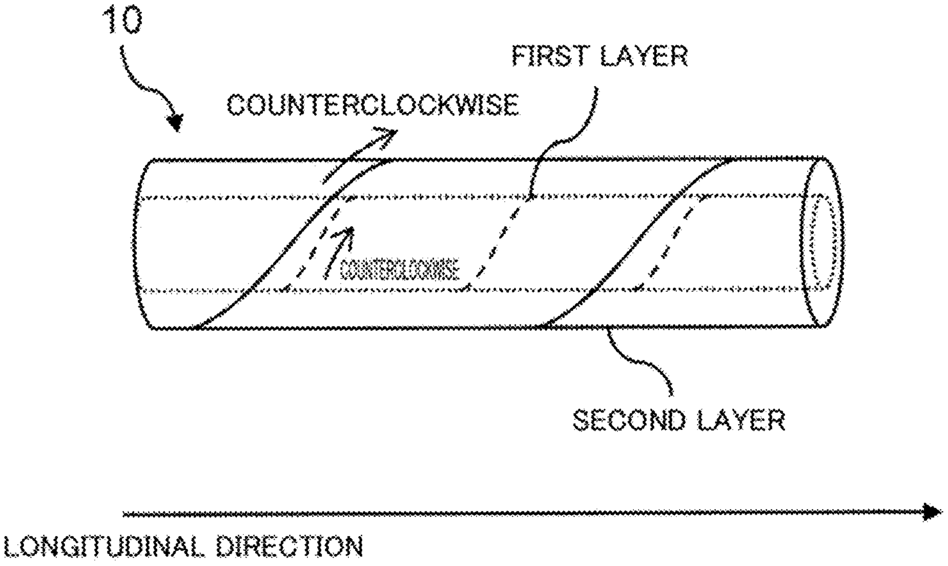
FIG. 3 is a diagram illustrating a twisting direction of a unit according to an embodiment.

The twisted structure of the units described above is based on an assumption that each unit of each layer is not replaced with a unit of an adjacent layer to each other. Here, the embodiment where the units of each layer are twisted in the same rotational direction from a point of view in the cross-sectional direction of the optical fiber cable, that is, the embodiment where the units are wound in the same direction with respect to the longitudinal direction of the optical fiber cable 10 will be described with reference to FIG. 3. In FIG. 3, a first layer and a second layer are illustrated as adjacent layers, and each layer is simply represented by a cylinder, and the twisting direction of each layer is shown. If the units of adjacent layers are wound in the same direction with respect to the longitudinal direction of the optical fiber cable 10 as shown in FIG. 3, the individual units are twisted approximately in parallel from the viewpoint of the cable side. As a result, when there is a gap between units of a certain layer, there is a possibility of change in position of the unit between adjacent layers, such as a unit of an adjacent layer entering the certain layer, and there is a concern that a preset twist pitch cannot be maintained. Therefore, the units 11 arranged in the layers adjacent to each other may be twisted so that the twisting directions of the spiral shapes are different from each other.

Figure 4:
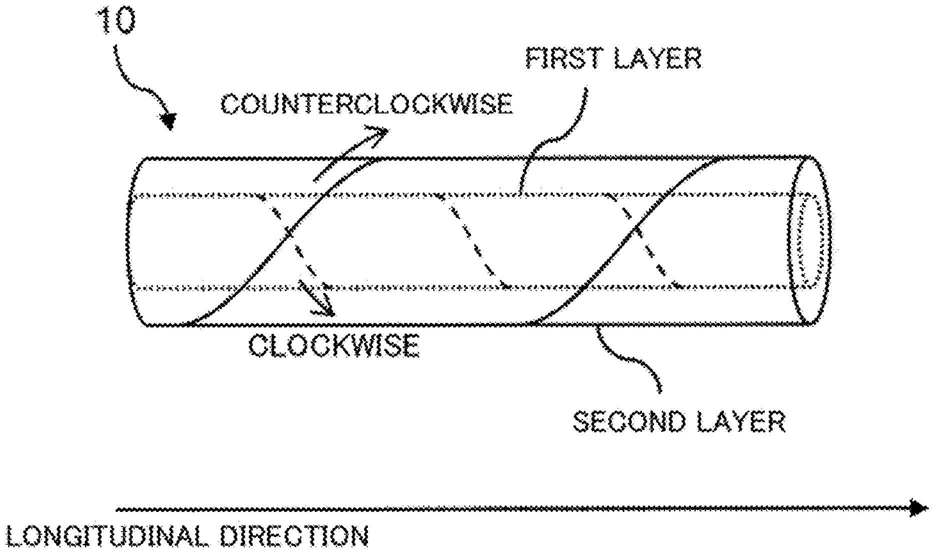
FIG. 4 is a diagram illustrating a twisting direction of a unit according to an embodiment.

As an example, the twisting direction of the spiral shape in the first layer and the second layer will be described with reference to FIG. 4. In FIG. 4, a first layer and a second layer are illustrated as adjacent layers, and each layer is simply represented by a cylinder, and twisting directions of the respective layers are shown. In the optical fiber cable 10 according to the present embodiment, as shown in FIG. 4, the twisting direction of the first layer may be clockwise and the second twisting direction may be counterclockwise with respect to the longitudinal direction of the optical fiber cable 10. With such a structure, since each unit is twisted so as to cross from the viewpoint of the side of the optical fiber as shown in FIG. 4, the unit can be stably manufactured with a desired twist pitch by suppressing the replacement of the positions of the adjacent units between the adjacent layers.

As described above, the optical fiber cable according to the present disclosure can ensure low crosstalk for all the multi-core optical fibers in the optical fiber cable having a plurality of identical multi-core optical fibers of non-coupling type in different spiral shapes, by shifting the curvatures of all own multi-core optical fibers from the curvature Rpk at which the crosstalk of the multi-core optical fibers is a maximum.

The above inventions can be combined as much as possible.

INDUSTRIAL APPLICABILITY

The optical fiber cable according to the present disclosure can be applied to the information communication industry.

REFERENCE SIGNS LIST

10: Optical fiber cable
11: Unit
12: Sheath

The invention claimed is:

1. An optical fiber cable formed by twisting a plurality of units each of which is formed by bundling a plurality of identical multi-core optical fibers, comprising:
that all the units have the same diameter;
that the units are arranged in a plurality of layers from a center in a cross section;
that the units are arranged in a spiral shape for each of the layers in a longitudinal direction;
that all the units included in one of the layers have the same twist pitch of the spiral shape; and
that the twist pitch is different for each layer, and is set based on a curvature Rpk of the multi-core optical fiber where crosstalk is the largest, wherein
a twist radius r1 of the spiral shape of the unit arranged in an innermost layer being set by a Math. C1;
a curvature ρ1 of the spiral shape of the unit arranged in the innermost layer being set by a Math. C2;
a curvature ρm of the spiral shape of the unit arranged in a specific layer different from the innermost layer being set by a Math. C3; and
a twist pitch Pm of the spiral shape of the units arranged in the specific layer being set by a Math. C4,
wherein the curvature Rpk does not coincide with the curvature ρ1;

[Math. C1]

$$r1 = d/\{2\times\sin(\pi/n)\} \quad \text{(C1)}$$

[Math. C2]

$$\rho 1 = r1\Big/\big(r1^2 + P1/2\pi)^2\big) \quad \text{(C2)}$$

[Math. C3]

$$\rho_m = \{r1 + d(m-1)\}\Big/\big[\{r1 + d(m-1)\}^2 + (Pm/2\pi)^2\big] \quad \text{(C3)}$$

[Math. C4]

$$Pm = 2\pi\sqrt{\frac{r1 + d(m-1)\cdot r1^2 + \left(\frac{P1}{2\pi}\right)^2 - [r1 + d(m-1)]^2}{r1}} \quad \text{(C4)}$$

Where d represents the diameter, n represents the number of units in the innermost layer, P1 represents a twist pitch of the spiral shape of the units arranged in the innermost layer and m represents the number of layers from the center of the specific layer when the innermost layer assumes a first layer.

2. The optical fiber cable according to claim 1, wherein the twisting directions of the spiral shapes of the units arranged in the layers adjacent to each other are different from each other.

3. An optical fiber cable formed by twisting a plurality of units each of which is formed by bundling a plurality of identical multi-core optical fibers, comprising:
that all the units have the same diameter;
that the units are arranged in a plurality of layers from a center in a cross section;
that the units are arranged in a spiral shape for each of the layers in a longitudinal direction;
that all the units included in one of the layers have the same twist pitch of the spiral shape; and
that the twist pitch is different for each layer, and is set based on a curvature Rpk of the multi-core optical fiber where crosstalk is the largest, wherein
a twist radius r1 of the spiral shape of the unit arranged in an innermost layer being set by a Math. C5;
a curvature ρ1 of the spiral shape of the unit arranged in the innermost layer being set by a Math. C6;
a curvature ρm of the spiral shape of the unit arranged in a specific layer different from the innermost layer being set by a Math. C7; and
a twist pitch Pm of the unit arranged in the specific layer being set by a Math. C8, wherein the curvature Rpk is one order of magnitude smaller than the curvature ρ1;

[Math. C5]

$$r1 = d/\{2\times\sin(\pi/n)\} \quad \text{(C5)}$$

[Math. C6]

$$\rho 1 = r1\Big/\big(r1^2 + (P1/2\pi)^2\big) \quad \text{(C6)}$$

[Math. C7]

$$\rho_m = \{r1 + d(m-1)\}\Big/\big[\{r1 + d(m-1)\}^2 + (Pm/2\pi)^2\big] \quad \text{(C7)}$$

[Math. C8]

$$Pm \geqq 2\pi\sqrt{\frac{r1 + d(m-1)\cdot r1^2 + \left(\frac{P1}{2\pi}\right)^2 - [r1 + d(m-1)]^2}{r1}} \quad \text{(C8)}$$

where d represents the diameter, n represents the number of units in the innermost layer, P1 represents a twist pitch of the spiral shape of the units arranged in the innermost layer, and m represents the number of layers from the center of the specific layer when the innermost layer assumes a first layer.

4. An optical fiber cable formed by twisting a plurality of units each of which is formed by bundling a plurality of identical multi-core optical fibers, comprising:
that all the units have the same diameter;
that the units are arranged in a plurality of layers from a center in a cross section;
that the units are arranged in a spiral shape for each of the layers in a longitudinal direction;
that all the units included in one of the layers have the same twist pitch of the spiral shape; and
that the twist pitch is different for each layer, and is set based on a curvature Rpk of the multi-core optical fiber where crosstalk is the largest, wherein
a twist radius r1 of the spiral shape of the unit arranged in an innermost layer being set by a Math. C9;
a curvature ρ1 of the spiral shape of the unit arranged in the innermost layer being set by a Math. C10;
a curvature ρm of the spiral shape of the unit arranged in a specific layer different from the innermost layer being set by a Math. C11; and a twist pitch Pm of the unit arranged in the specific layer being set by a Math. C12,
wherein the curvature Rpk is one order of magnitude larger than the curvature ρ1

[Math. C9]

$$r1 = d/\{2\times\sin(\pi/n)\} \quad \text{(C9)}$$

[Math. C10]

$$\rho 1 = r1\Big/\big(r1^2 + (P1/2\pi)^2\big) \quad \text{(C10)}$$

-continued

[Math. C11]

$$\rho_m = \{r1 + d(m-1)\} \Big/ \left[\{r1 + d(m-1)\}^2 + (Pm/2\pi)^2\right] \quad \text{(C11)}$$

[Math. C12]

$$Pm \leqq 2\pi\sqrt{\frac{r1 + d(m-1)\cdot r1^2 + \left(\frac{P1}{2\pi}\right)^2 - [r1 + d(m-1)]^2}{r1}} \quad \text{(C12)}$$

where d represents the diameter, n represents the number of units in the innermost layer, P1 represents a twist pitch of the spiral shape of the units arranged in the innermost layer, and m represents the number of layers from the center of the specific layer when the innermost layer assumes a first layer.

* * * * *